(12) United States Patent
Kusic

(10) Patent No.: US 8,196,854 B2
(45) Date of Patent: *Jun. 12, 2012

(54) TILT ROTOR AIRCRAFT WITH TILTING TAIL ROTOR—TT

(76) Inventor: Tom Kusic, Maribyrnong (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,855

(22) Filed: Apr. 21, 2011

(65) Prior Publication Data

US 2011/0210212 A1 Sep. 1, 2011

Related U.S. Application Data

(62) Division of application No. 09/180,925, filed on Nov. 16, 1998, now abandoned.

(51) Int. Cl.
*B64C 27/06* (2006.01)

(52) U.S. Cl. .................. 244/17.11; 244/17.27

(58) Field of Classification Search ............... 244/17.11, 244/4 A, 17.25, 8, 17.19, 7 R, 7 A, 17.27; 416/148

See application file for complete search history.

(56) References Cited

U.S. PATENT DOCUMENTS

| | | | |
|---|---|---|---|
| 2,378,617 A | 6/1945 | Burke | |
| 2,569,882 A | 10/1951 | De Bothezat | |
| 2,589,030 A | 3/1952 | Aide | |
| 2,677,431 A | 5/1954 | Prince | |
| 2,724,446 A | 11/1955 | Hill | |
| 2,818,122 A | 12/1957 | Johnston | |
| 2,861,641 A | 11/1958 | Bensen | |
| 3,100,610 A | 8/1963 | Armstrong | |
| 3,135,481 A | 6/1964 | Sudrow | |
| 3,428,271 A | 2/1969 | Hollrock et al. | |
| 3,474,987 A | 10/1969 | Meditz | |
| 3,554,467 A | 1/1971 | Yowell | |
| 3,921,939 A | 11/1975 | Garfinklle | |
| 4,358,073 A | 11/1982 | Eickmann | |
| 4,720,059 A * | 1/1988 | Stearns, Jr. ................. 244/17.11 |
| 6,598,827 B2 | 7/2003 | Kusic | |
| 7,438,260 B2 | 10/2008 | Kusic | |

FOREIGN PATENT DOCUMENTS

| | | |
|---|---|---|
| AU | 675906 | 5/1996 |
| CA | 2258311 | 11/1997 |
| DE | 19540272 A1 | 4/1997 |
| WO | WO 84/00339 | 2/1984 |
| WO | WO 85/03052 | 7/1985 |

OTHER PUBLICATIONS

U.S. Appl. No. 12/801,812, filed Oct. 21, 2010, Tom Kusic.
U.S. Appl. No. 11/454,309, filed May 24, 2007, Tom Kusic.
U.S. Appl. No. 11/446,231, filed Oct. 19, 2006, Tom Kusic. U.S. Appl. No. 11/442,404, filed May 10, 2007, Tom Kusic.
U.S. Appl. No. 10/651,948, filed Jul. 29, 2004, Tom Kusic.
U.S. Appl. No. 12/588,783, filed Feb. 25, 2010, Tom Kusic.
Letter dated Sep. 16, 1998, by Mr. Trevor Ralston of Denel Aviation. letter attached.
Book: Aerodynamics of the helicopter, by Alfred Gessow and Garry C. Myers, Jr., published by: The McMillan company, New York, 1952.

* cited by examiner

*Primary Examiner* — Tien Dinh

(57) ABSTRACT

A vertical take-off aircraft comprising a main power plant 1 at the top of the aircraft which consists of an assembly of blades 2, 3, a rotor 4 and a main engine assembly 5. The main power plant is connected to the main body 6 of the aircraft by a tilt enabling joint 7.

The tilt enabling joint is connected to the main body by a telescopic tube assembly comprising tubes 12 and 13. To counter the rotational force exerted on the main body 6 of the aircraft by the rotation of the blades 2, 3, an additional power plant 15 is attached to the main power plant. Tilting the main power plant causes tilting of the additional power plant.

3 Claims, 14 Drawing Sheets

TILT ROTOR AIRCRAFT WITH TILTING TAIL ROTOR—TT

CROSS REFERENCE TO RELATED APPLICATIONS

This is a divisional patent application, being a division of the U.S. patent application Ser. No. 09/180,925 filed Nov. 16, 1998 now abandoned.

STATEMENT REGARDING FEDERALLY SPONSORED RESEARCH OR DEVELOPMENT

Not applicable.

REFERENCE TO SEQUENCE LISTING

Not applicable.

BACKGROUND OF THE INVENTION

Field of the Invention

This invention relates to the vertical take-off field of aviation.

BRIEF SUMMARY OF THE INVENTION

There are many helicopters in existence today. However, helicopters rely on variable pitch rotor blades to maintain control and provide vertical lift, and the construction of helicopters with variable pitch rotors has resulted in limited operational ability when helicopters are used in forest areas, at high altitudes where the air is thin and when operating near steep mountains. Pitch varying mechanisms require frequent time consuming and expensive maintenance and a failure in the pitch varying mechanism on a helicopter often results in disaster due to instantaneous loss of control that cannot be overcome.

The present invention overcomes the need for varying the pitch of rotor blades while at the same time allowing vertical lift on take-off and directional control by providing a vertical take-off aircraft using a propeller or main rotor assembly at the top of the aircraft, which main rotor assembly consists of an assembly of blades and a rotor.

Vertical lift is obtained by the rotation of the propeller or main rotor assembly thereby forcing air in a downward direction by way of the angle of pitch of the blades. Rotation of the propeller or main rotor assembly is achieved using an engine assembly located between the main body of the aircraft and the blades of the propeller or main rotor assembly, which engine assembly is the main engine assembly forming part of the aircraft, and which main engine assembly is connected to the main body of the aircraft by a tilt enabling joint. The tilt enabling joint consists of numerous components, some of which provide the means to support the main body of the aircraft below the main engine assembly and allow the tilt enabling joint to have a tilting ability while other components provide the means to control and cause tilting motions in the tilt enabling joint during flight, thereby enabling controlled tilting to occur, such that the main engine assembly and the main rotor assembly can be tilted together as a unity relative to the main body of the aircraft in a controlled manner during flight, thereby providing a means for controlling the directional travel of the aircraft during flight and changing the aircraft's direction of travel. The main rotor assembly and the main engine assembly can be merged in the form of turboprop. That is, the aircraft could comprise a turboprop at the top of the aircraft, which is connected to the main body of the aircraft by a tilt enabling joint, with vertical lift being achieved by means of the blades of the turboprop forcing air in a downward direction.

During flight, rotational stability of the main body of the aircraft is maintained by means of an additional engine assembly attached to the aircraft which rotates an additional propeller or rotor assembly, thereby pushing air primarily in a horizontal direction to counter the rotational force exerted on the main body of the aircraft by the rotation of the upper main rotor assembly, which additional rotor assembly consists of an assembly of blades and a rotor. The additional propeller or rotor assembly and the additional engine assembly can be merged in the form a turboprop or even a jet engine. At the time of filing, potential practical applications of this aircraft could be seen on the internet on Youtube.com, by searching under "FYTNDM".

Hence, in one form the aircraft could comprise a turboprop at the top of the aircraft to force air in a downward direction, which turboprop is connected to the main body by a tilt enabling joint, and an additional turboprop to force air to travel in a horizontal direction to counter the rotational force exerted on main body of the aircraft by operation of the main turboprop at the top of the aircraft.

In another form of the aircraft, the aircraft could comprise a turboprop at the top of the aircraft, connected to the main body of the aircraft by a tilt enabling joint, and a jet that can force exhaust gas to travel in a horizontal direction to counter the rotational force exerted on the main body of the aircraft by operation of the turboprop at the top of the aircraft.

As can be seen from the diagrams that follow, the present invention makes many of the components needed to construct a conventional helicopter obsolete, while providing an aircraft that can perform not only tasks normally performed by conventional helicopters but also other tasks that conventional helicopters cannot perform due to their configuration necessitated by variable pitch rotors—such as landing among trees in a forest without cleared landing zones, and grasping trees growing in a forest with grasping mechanisms to gain support and stability by grasping trees.

BRIEF DESCRIPTION OF THE SEVERAL VIEWS OF THE DRAWINGS

Embodiments of the invention will now be described by way of example with reference to the accompanying drawings, of which.

DETAILED DESCRIPTION OF THE DRAWINGS

Figure 1:
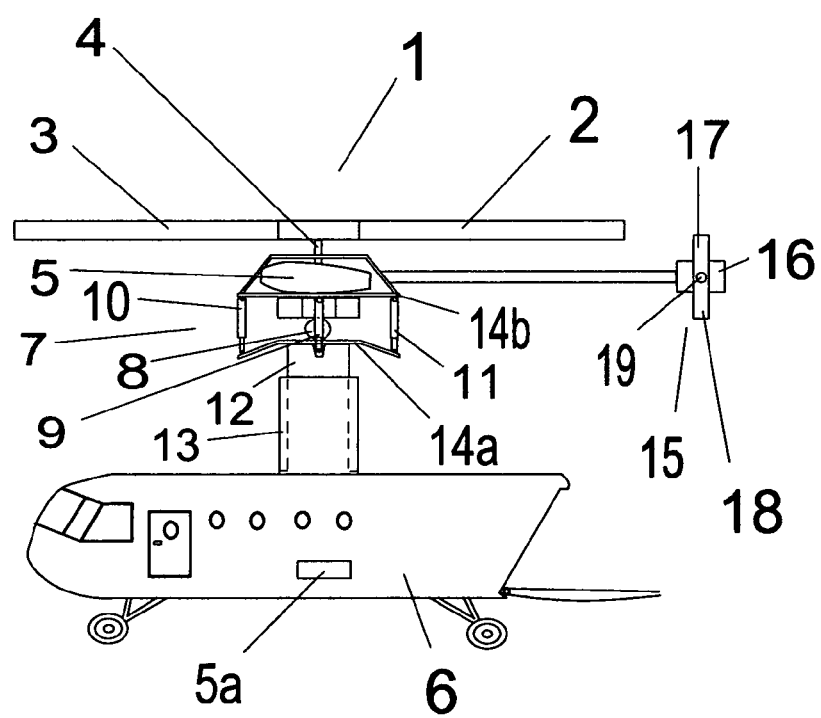
FIG. 1 is a view of the left side of one form of aircraft according to this invention.

FIG. 1 shows one form of aircraft according to this invention.

Looking at the aircraft in FIG. 1 it can be seen that the aircraft comprises a main power plant 1 at the top of the aircraft, which main power plant consists of an assembly of blades 2, 3, a rotor 4 and a main engine assembly 5. The blades 2, 3, and rotor 4 form a main rotor assembly.

Rotation of the main rotor assembly is achieved by using the engine assembly 5, which is the main engine assembly on the aircraft. Vertical lift is obtained by the rotation of the main rotor assembly. Rotation of the main rotor assembly forces air in a downward direction by way of the angle of pitch of the blades 2 and 3. The blades 2 and 3 are above the main engine assembly. The main power plant is connected to the main body 6 of the aircraft by a tilt enabling joint 7. The tilt enabling joint 7 allows tilting of the main power plant 1 relative to the main body 6 of the aircraft to occur in a controlled manner. A universal joint 8 is used to allow tilting to occur. The tilt enabling joint 7 is fitted with hydraulic actuators 9, 10 and 11, that allow the tilting of the tilt enabling joint 7 to be controlled.

Tilting of the main power plant 1 initiates changes in the direction of travel of the aircraft without the need to change the pitch angles of the blades 2 and 3. The tilt enabling joint 7 is connected to the main body 6 by telescopic tube assembly comprising oblong shaped tubes 12 and 13. The base 14a of the tilt enabling joint is connected to tube 12.

To counter the rotational force exerted on the main body 6 of the aircraft by the rotation of the main rotor assembly, FIG. 1 shows an additional power plant 15 connected to the upper section 14b of the tile enabling joint. The additional power plant 15 comprises an additional engine assembly 16 and an additional rotor assembly. The additional rotor assembly consists of blades 17 and 18, and a rotor 19. Rotation of the additional rotor assembly pushes air in a primarily horizontal direction by way of the pitch of the blades 17 and 18. By forcing air to travel in a horizontal direction, the additional power plant acts to counter the rotational force exerted on the main body 6 of the aircraft by the rotation of the main rotor assembly. Tilting of the main power plant thus causes the additional power plant to move relative to the main body of the aircraft. A grasping mechanism 5a is shown positioned on the side of the main body of the aircraft.

Figure 2:
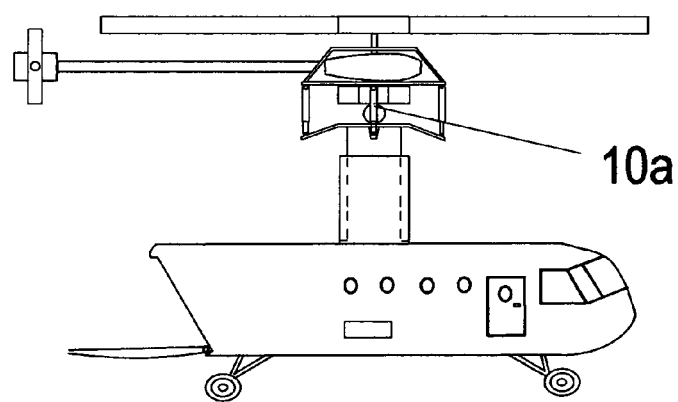
FIG. 2 is a view of the right side of the aircraft of FIG. 1.

FIG. 2 shows the aircraft of FIG. 1 rotated horizontally 180 degrees to show the hydraulic actuator 10a on right side of the tilt enabling joint.

Figure 3:
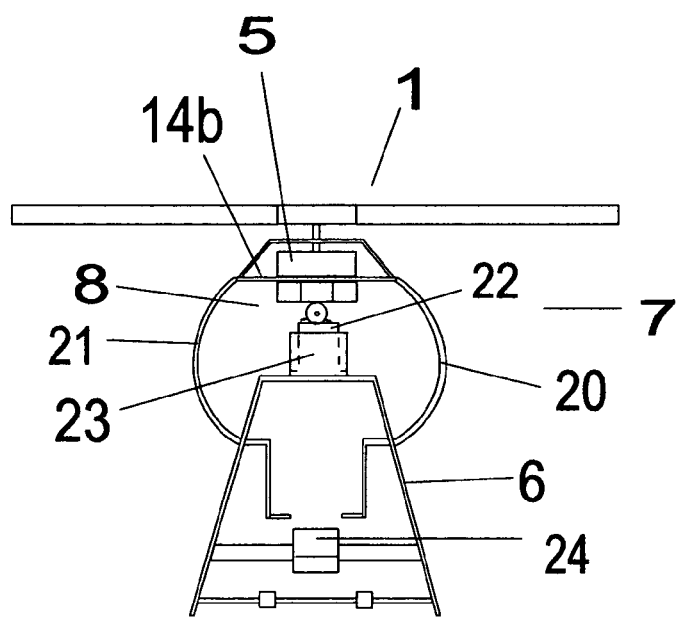
FIG. 3 is a view of the front of yet another form of aircraft according to this invention.

FIG. 3 shows the front view of another form of the aircraft with handles 20 and 21 forming part of the tilt enabling joint 7. The handles 20 and 21 are attached to the upper section 14 of the tilt enabling joint. The tilting ability of the tilt enabling joint is achieved by the universal joint 8. The aircraft has a main rotor assembly which is rotated by a main engine assembly 5. Directional control of the aircraft during flight is achieved by controlled tilting of the upper section 14b of the tilt enabling joint relative to the main body 6 of the aircraft, thereby tilting the main power plant 1. Controlled tilting of the upper section 14b of the tilt enabling joint during flight is enabled by the handles 20 and 21. Moving the handles 20 and 21 relative to the main body of the aircraft 6 would be capable of causing a forward and rearward tilting to the upper section of the tilt enabling joint, as well as sideways tilting. The tilt enabling joint is connected to the main body by a telescopic tube assembly comprising oblong shaped tubes 22 and 23. A seat 24 is also shown.

Figure 4:
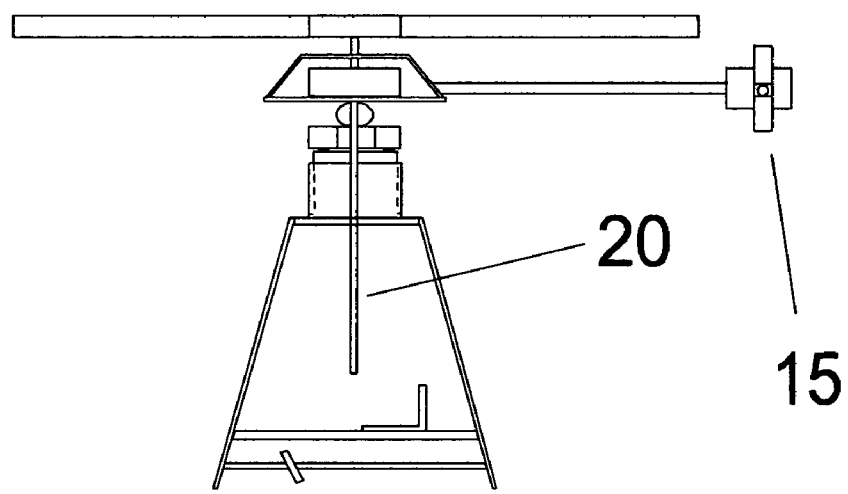
FIG. 4 is the left side view of the aircraft of FIG. 3.

FIG. 4 is the left side view of FIG. 3, showing the position of the left handle 20 from a side view and the additional power plant 15.

Figure 5:
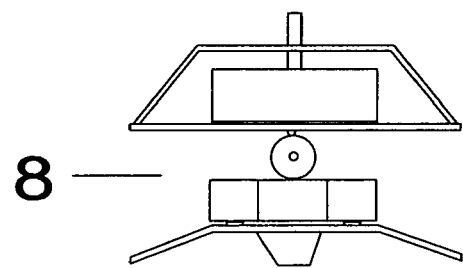
FIG. 5 is an enlarged view of a universal joint.
Figure 6:
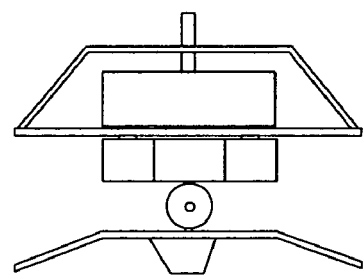
FIG. 6 is a rotated view of the universal joint of FIG. 5.

FIGS. 5 and 6 show the universal joint 8 of the tilt enabling joint of FIG. 1. FIG. 6 is FIG. 5 rotated 90 degrees horizontally.

Figure 7:
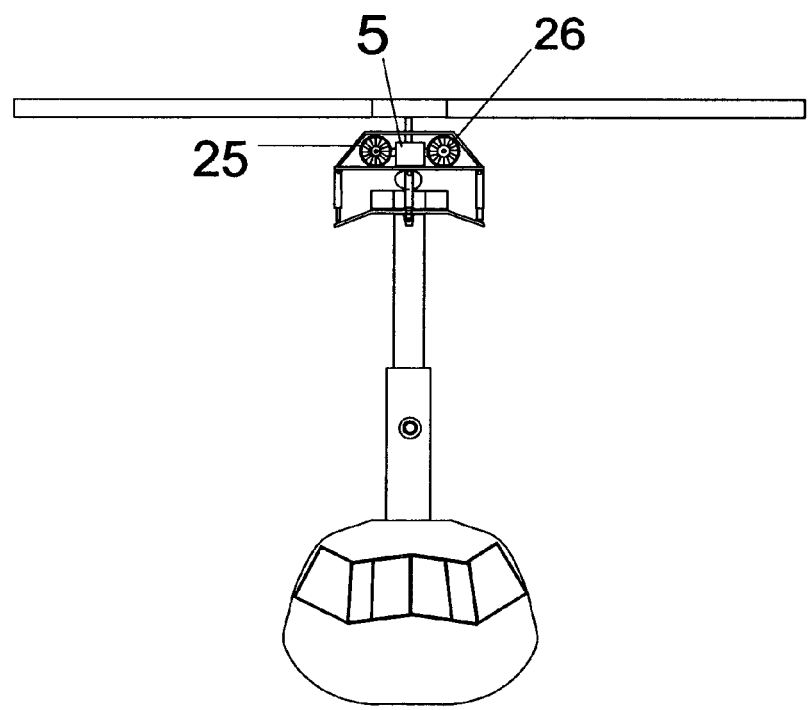
FIG. 7 shows the main engine assembly comprising two engines.

FIG. 7 shows a version of the aircraft with the main engine assembly 5 comprising two engines 25 and 26. The main engine assembly in FIG. 1 comprised a single engine.

Figure 8:
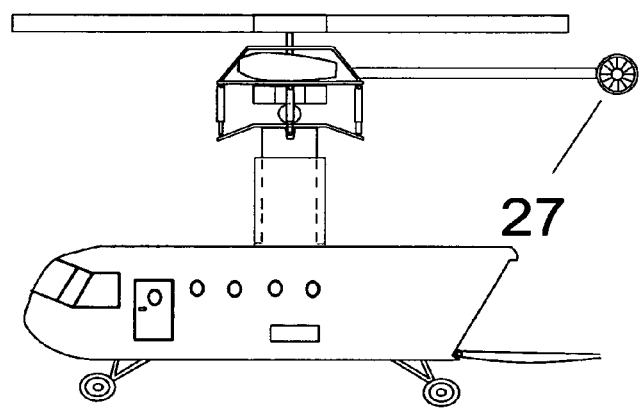
FIG. 8 shows one form of the aircraft with the additional engine assembly and additional rotor assembly replaced by a jet engine.

FIG. 8 shows a version of the aircraft of FIG. 1 with a jet engine 27 replacing the additional power plant 15 shown in FIG. 1. The jet engine is connected to the main power plant. The jet engine shown is a turbojet. In another form of the aircraft, the jet engine is a turbofan.

Figure 9:
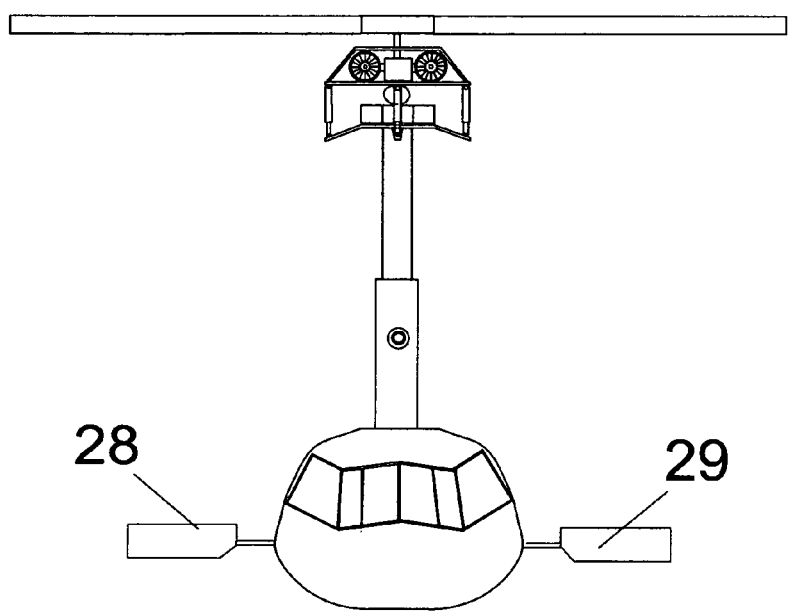
FIG. 9 shows how variable pitch fins could be positioned on the aircraft.

FIG. 9 shows how variable pitch fins 28 and 29 could be positioned on the aircraft. The variable pitch fins could augment control of the aircraft, and could be used as airbrakes. They could also provide lift during high speed forward flight, such as wings on an airplane, since downward airflow from the main rotor assembly would be directed to the rear of the aircraft, due to the tilting of the main rotor assembly in a forward direction and the distance of the main rotor assembly from the variable pitch fins.

Figure 10:
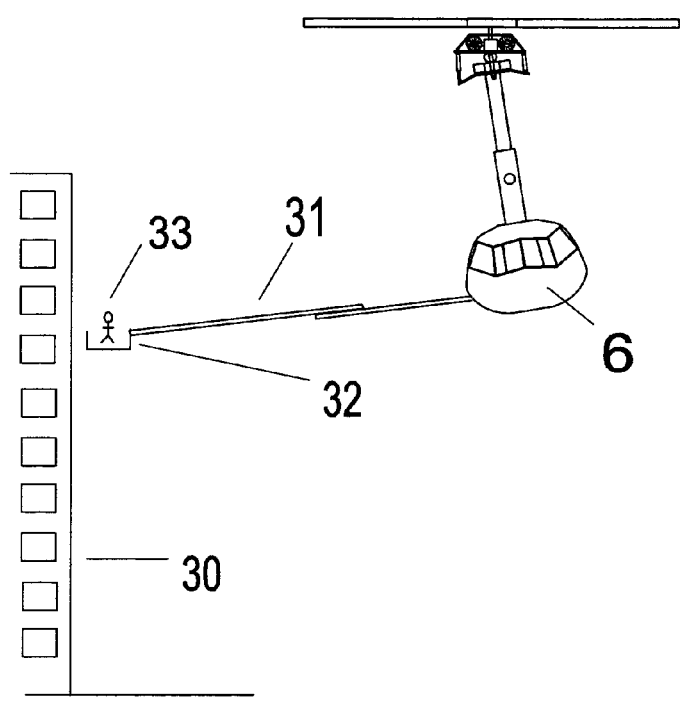
FIG. 10 shows how one form of the aircraft could be used to evacuate people from the side of a building.

FIG. 10 shows how an aircraft according to this invention could be used as an evacuation vehicle for persons trapped in a building 30. An extension ladder 31 secured to the main body 6 of the aircraft is shown in extended form, with a basket 32 at the end of the extension ladder. FIG. 10 shows how a person 33 could be rescued from the building. The large distance between the main rotor and the main body of the aircraft makes the main body 6 of the aircraft act like a keel on a yacht, so that an extension ladder has a minimal effect on the ability to control the aircraft. The main body could be tilted slightly, while the main rotor assembly could be maintained in a level position.

Figure 11:
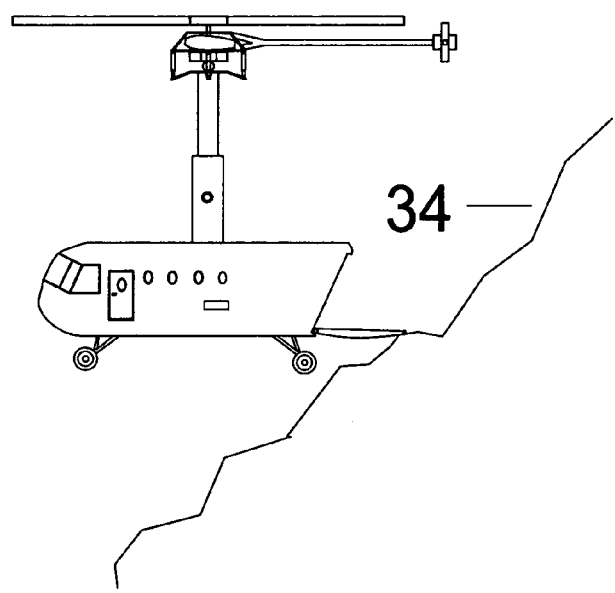
FIG. 11 shows how the aircraft could make contact with the side of steep mountain while the rotors are kept at a safe distance.

FIG. 11 shows how the aircraft could be used to quickly unload supplies on the side of a steep mountain 34, or quickly evacuate injured persons without having to use a winch. The relatively short distance between the main rotor and the main body of a conventional helicopter would prevent the main body of a conventional helicopter being able to make contact with such a steep mountain without a high risk of the rotor blades impacting with the mountain.

Figure 12:
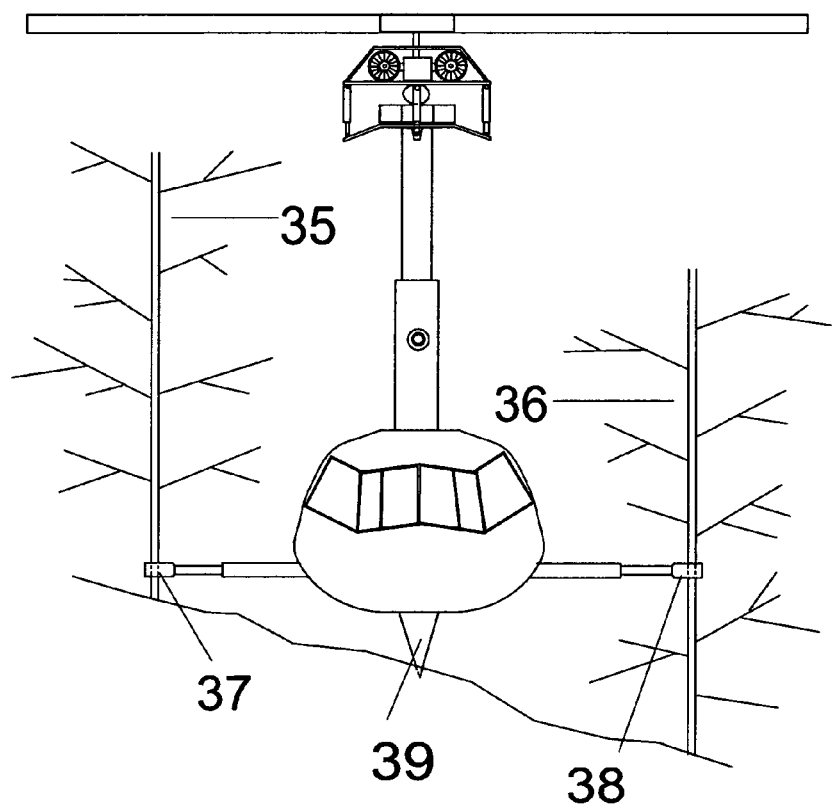
FIG. 12 shows that by keeping the main rotor at a large distance from the main body of the aircraft, the aircraft would be able to land among trees while the main rotor is kept above the trees, and grasp surrounding trees with grasping mechanisms.

FIG. 12 shows how a form of the aircraft could land between trees 35 and 36, while the main rotor assembly is kept above the tops of the trees. Cargo could be loaded and unloaded or injured persons evacuated without using a winch. Grasping mechanisms 37 and 38 are shown grasping trees 35 and 36 respectively, providing support and stability for the aircraft while a sharpened section 39 protruding beneath the main body bears some of the weight of the aircraft.

The aircraft could land in an area such as a forest where the rotors of a conventional helicopter would impact with the trees. The aircraft would not require a cleared landing zone to land in a forest. In a war, the possible landing area would be less predictable by an enemy force, reducing the risk of an ambush around a cleared landing zone. If the aircraft was operated on a battle field and the aircraft was targeted by a heat seeking missile during flight, having the main power plant and the additional power plant located away from the main body of the aircraft would provide the occupants with a greater chance of survival than if the main power plant was attached directly to the main body of the aircraft if the missile caused a fire at the main power plant.

Figure 13:
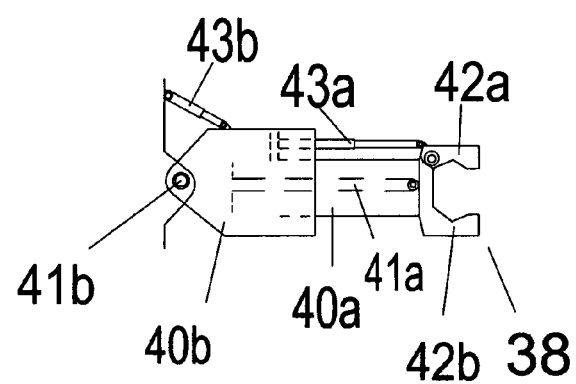
FIG. 13 shows a enlarged view of a grasping mechanism used by the aircraft of FIG. 12.

FIG. 13 shows the grasping mechanism 38 from FIG. 12 as viewed from above. The grasping mechanism comprises a moveable component 42a which can be moved towards a rigid component 42b by hydraulic actuator 43a. Expansion of the hydraulic actuator 43a creates a grasping motion between 42a and 42b. The grasping mechanism is connected to the main body of the aircraft by a hollow beam 40a, which can be extended outward by means of hydraulic actuator 41a, such that the beam 40a can operate in a telescopic manner sliding in and out of an enclosure 40b. The enclosure 40b is connected to the main body of the aircraft by a bolt 41b, which enables the enclosure 40b to swivel relative to the main body. The swiveling motion of the enclosure 40b is controlled by hydraulic actuator 43b. Hydraulic actuator 43b is connected to the enclosure 40b and the main body of the aircraft.

Figure 14:
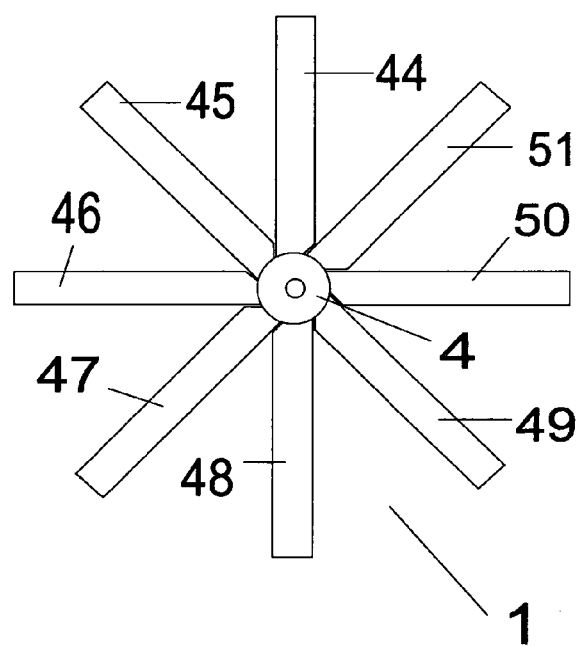
FIG. 14 shows that as many as eight rotor blades can be assembled around a small rotor hub when blade pitch varying components are not required.

FIG. 14 shows how eight rotor blades 44, 45, 46, 47, 48, 49, 50, 51, can be assembled around a rotor 4 when space is not required for blade pitch varying components. This number of rotor blades would allow the main rotor assembly to be rotated at a lower rate of revolution than a rotor assembly with fewer blades, to achieve the same lifting ability, resulting in a relatively quieter aircraft. Having a high number of rotor blades would help the aircraft to operate in high altitude mountainous regions or hot regions, where the air is thin.

The claims defining this invention are as follows:

1. A vertical take-off aircraft comprising a means for downwardly extending thrust, a main body, and a means for extending thrust in a lateral direction relative to the main body, which means for downwardly extending thrust is connected to the main body by a tilt enabling means such that the means for downwardly extending thrust is able to be tilted in a plurality of directions and angles relative to the main body, in a controlled manner, and which means for extending thrust in a lateral direction is connected to the main body such that tilting of the means for downwardly extending thrust relative to the main body is able to cause the means for extending thrust in a lateral direction to move relative to the main body, and which means for extending thrust in a lateral direction, while in a substantially fixed position relative to the main body, is able to counter a rotational force exerted on the main body that could be caused by the means for downwardly extending thrust.

2. A vertical take-off aircraft with a main body, the said aircraft comprising a main power plant, with vertical lift being achieved by means of the main power plant forcing air in a downward direction and which main power plant is connected to the main body of the aircraft by a tilt enabling joint such that the main power plant can be tilted in a plurality of directions and angles relative to the main body of the aircraft, in a controlled manner, and which said tilt enabling joint is connected to the main body of the aircraft, with an additional power plant connected to the aircraft, which additional power plant is able to force air to travel in a horizontal direction, such that by forcing air to travel in a horizontal direction, relative to the main body of the aircraft, a rotational force exerted on the main body of the aircraft by the main power plant can be countered, and which additional power plant is connected to the aircraft such that tilting of the main power plant relative to the main body of the aircraft is able cause the additional power plant to move relative to the main body of the aircraft.

3. A vertical take-off aircraft with a main body, the said aircraft comprising a main power plant, with vertical lift being achieved by means of the main power plant forcing air in a downward direction and which main power plant is connected to the main body of the aircraft by a tilt enabling joint such that the main power plant can be tilted in a plurality of directions and angles relative to the main body of the aircraft, in a controlled manner, and which said tilt enabling joint is connected to the main body of the aircraft, with an additional power plant connected to the aircraft, which additional power plant is able to force air to travel in a horizontal direction, such that by forcing air to travel in a horizontal direction, relative to the main body the aircraft, a rotational force exerted on the main body of the aircraft by the main power plant can be countered, and Which tilt enabling joint is connected to the main body of the aircraft such that the distance between the base of the tilt enabling joint and the main body is able to be varied.

\* \* \* \* \*